United States Patent [19]
Turner

[11] Patent Number: 6,098,719
[45] Date of Patent: Aug. 8, 2000

[54] PARALLELOGRAM BOOM DEVICES FOR MOUNTING AGRICULTURAL IMPLEMENTS TO SHORT WHEEL BASE TRACTORS AND ADJUSTING IMPLEMENT POSITION RELATIVE TO GROUND

[76] Inventor: James R. Turner, 5900 Orange Ave., Ft. Pierce, Fla. 32954

[21] Appl. No.: 09/203,859

[22] Filed: Dec. 2, 1998

[51] Int. Cl.[7] .................................................. A01B 63/106
[52] U.S. Cl. ........................................ 172/307; 172/776
[58] Field of Search ...................... 172/216, 307, 172/417, 484, 699, 776, 781; 414/680, 917

[56] References Cited

U.S. PATENT DOCUMENTS

| | | | |
|---|---|---|---|
| 2,584,217 | 2/1952 | Morkoski | 172/307 |
| 2,732,675 | 1/1956 | Smith et al. | 56/6 |
| 2,833,197 | 5/1958 | Oehler et al. | 172/307 |
| 2,886,114 | 5/1959 | Peterson | 172/298 |
| 2,987,127 | 6/1961 | Morrison et al. | 172/484 |
| 3,106,970 | 10/1963 | Smith et al. | 172/307 |
| 3,507,335 | 4/1970 | Nokleby | 172/300 |
| 3,807,508 | 4/1974 | Kelley | 172/484 |
| 4,126,189 | 11/1978 | Channel | 172/484 |
| 4,953,625 | 9/1990 | Hurworth | 172/307 |
| 5,150,999 | 9/1992 | Dugan | 414/24.5 |
| 5,228,522 | 7/1993 | Stufflebeam et al. | 172/417 |
| 5,321,938 | 6/1994 | LeBlanc | 56/6 |
| 5,566,537 | 10/1996 | Kieffer et al. | 56/15.2 |

*Primary Examiner*—Thomas B. Will
*Assistant Examiner*—Nathan Mammen
*Attorney, Agent, or Firm*—Carroll F. Palmer

[57] ABSTRACT

A parallelogram boom device for mounting agricultural implements has a parallelogram arrangement of a first upper beam horizontally and longitudinally aligned with a second upper beam plus a single lower beam longitudinally aligned with the first and second upper beams, but at a lower horizontal level. A first hydraulic piston unit acts via a bridle to raise and lower the parallelogram arrangement relative to the ground. An agricultural implement is attached at one end to a mounting arm supported via the parallelogram arrangement and a second hydraulic piston unit serves to move the implement in an arc about its attached end. The new boom devices also have the capability of retracting the supported implements rearwards from their forward direction of travel in the event the implement encounters a rock, stump or like obstruction.

7 Claims, 7 Drawing Sheets

PARALLELOGRAM BOOM DEVICES FOR MOUNTING AGRICULTURAL IMPLEMENTS TO SHORT WHEEL BASE TRACTORS AND ADJUSTING IMPLEMENT POSITION RELATIVE TO GROUND

BACKGROUND OF THE INVENTION

1. Field of the Invention

This application relates to parallelogram boom devices for mounting agricultural implements to short wheel base tractors and adjusting implement position relative to ground during operation of the implements from the tractors. More particularly, it concerns assemblies of boom devices with short wheel base tractors for supporting spraying, cutting or like agricultural implements extending laterally from the tractors for movement close to the ground in a manner permitting such implements to: (1) have accurately controlled position relative to the ground from aboard the tractors and (2) kickback from the direction of travel in the event the implement encounters a rock, post, stump or like endangering obstruction.

2. Description of the Prior Art

There are many type operations in which a land vehicle, typically a tractor, must transit terrain with some form of implement held thereby close to the ground, but out of contact therewith. An example of such operation is the periodic spraying of liquids onto the ground from spray jets fixed to a boom carried by a tractor as disclosed in U.S. Pat. Nos. 4,206,569, 5,012,608 & 5,280,685.

It is know to use parallelogram booms to raise and lower platforms relative to ground as shown by U.S. Pat. Nos. 5,129,480 and 5,605,431. The present invention applies this parallelogram principle in unique manner to enable short wheel base tractors to laterally support agricultural implements, particularly spray units, while permitting their position relative to ground to be adjusted by an operator aboard the tractors.

Typically, prior art parallelogram booms are constructed with one or more pairs of upper and lower beams. Thus, they will have a single pair of upper and lower beams, e.g., see U.S. Pat. Nos. 5,477,930 and 5,560,130, or plural pairs of upper and lower beams, e.g., see U.S. Pat. Nos. 5,249,643, 5,577,563 and 5,584,356. In contrast, the booms of the present invention comprise two upper beams with a single lower beam thereby enabling this unique type of parallelogram boom to operate inboard of the front wheels of tractors and outboard of a front end tractor motor.

OBJECTS

A principal object of the invention is the provision of unique parallelogram boom devices for mounting agricultural implements to short wheel base tractors and for adjusting the position, i.e., height and angle, of the implements relative to ground during their operation.

Another object is the provision of such boom devices capable of being positioned between the front wheels of tractors and the front end tractor motor to operate inboard of the front wheels of tractors and above their drive axles while, at the same time, being able to handle the severe twisting forces applied to them by the side extending implements which they support.

Further objects include the provision of such boom devices having (1) the capability of retracting supported implements rearwards from their forward direction of travel in the event the implement encounters a rock, post, stump or like endangering obstruction.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a unique parallelogram boom device for mounting agricultural implements to short wheel base tractors having right and left front wheels mounted via an axle unit to a chassis that carries a motor assembly between the wheels and adjusting the position of such mounted implements relative to ground during their operation.

The new boom devices of the invention basically comprise a parallelogram arrangement of a first upper beam horizontally and longitudinally aligned with a second upper beam plus a single lower beam longitudinally aligned with the first and second upper beams, but at a horizontal level therebelow, the parallelogram arrangement being defined by a forward end and a rearward end.

Further, the boom device includes (a) a mount adapted to be carried upon the tractor chassis inboard of the wheels comprising a vertical plate, (b) a horizontal top spar and (c) a horizontal bottom spar with both spars supported by the vertical plate in a plane parallel to the plate.

The forward end of the parallelogram arrangement is supported by the top and bottom spars and hydraulic piston means is attached to the parallelogram arrangement to raise and lower it.

A frame is positioned vertically adjacent the rearward end of the parallelogram arrangement which is supported by the rearward end of the parallelogram arrangement and a lug extends laterally from the frame carrying a outboard bearing.

There is an implement mounting arm defined by an inboard end and an outboard end. Such inboard end is rotationally pinned to the bearing and the outboard end is equipped to support an agricultural implement. Hydraulic piston means is attached to the implement mounting arm to raise and lower it plus any agricultural implement attached thereto.

The objects of the invention are further accomplished by the combination of a short wheel base tractor with at least one parallelogram boom device as above described positioned either on the right or left side of the tractor. Alternatively, such combination may comprise a pair of the new parallelogram boom devices.

The objects of the invention are still further accomplished by structuring the new parallelogram boom device to include kickback means to retract the implement mounting arm rearwards from its forward direction of travel to protect any mounted agricultural implement against damage in the event the implement supported thereby encounters an obstruction, e.g., rock, stump or the like.

In a preferred embodiment of the new parallelogram boom devices, the kickback means basically comprises an accumulator, a first flow control value, a second flow control value, a hydraulic cylinder means and a relief valve.

The accumulator is attached to a T-connector defined by an accumulator connection, a first valve connection and a second valve connection. The first flow control value is joined to the first valve connection for controlled flow of fluid there through away from the accumulator, but free flow toward the accumulator. Further, the second flow control value is joined to the second valve connection for controlled flow of fluid there through away from the accumulator, but free flow toward the accumulator.

The hydraulic cylinder means comprises a cylinder, a piston that reciprocates therein defined by a first face and a second face, a shaft defined by an internal end and an external end and the internal end is attached to the first face. There is a first cylinder port in the cylinder that communicates with the first face of the piston and a second cylinder port that communicates with the second face. First tubing operatively joins the first flow control valve to the first cylinder port for fluid flow there between.

The relief valve comprises a first relief valve port and a second relief valve port and second tubing operatively joins the second flow control valve to the first relief valve port for fluid flow there between. Finally, third tubing operatively joins the second cylinder port to the second relief valve port for fluid flow there between.

In order to permit an operator positioned in the drivers compartment of the short wheel base tractor equipped with a parallelogram boom device of the invention, hydraulic lines lead into such compartment where they are associated with control valves having hand levers that permit the operator to move agricultural implements up and down horizontally, angle the implements relative to the horizon and manipulate the kickback protection feature.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein.

DESCRIPTION OF THE PREFERRED EMBODIMENTS

Figure 1:
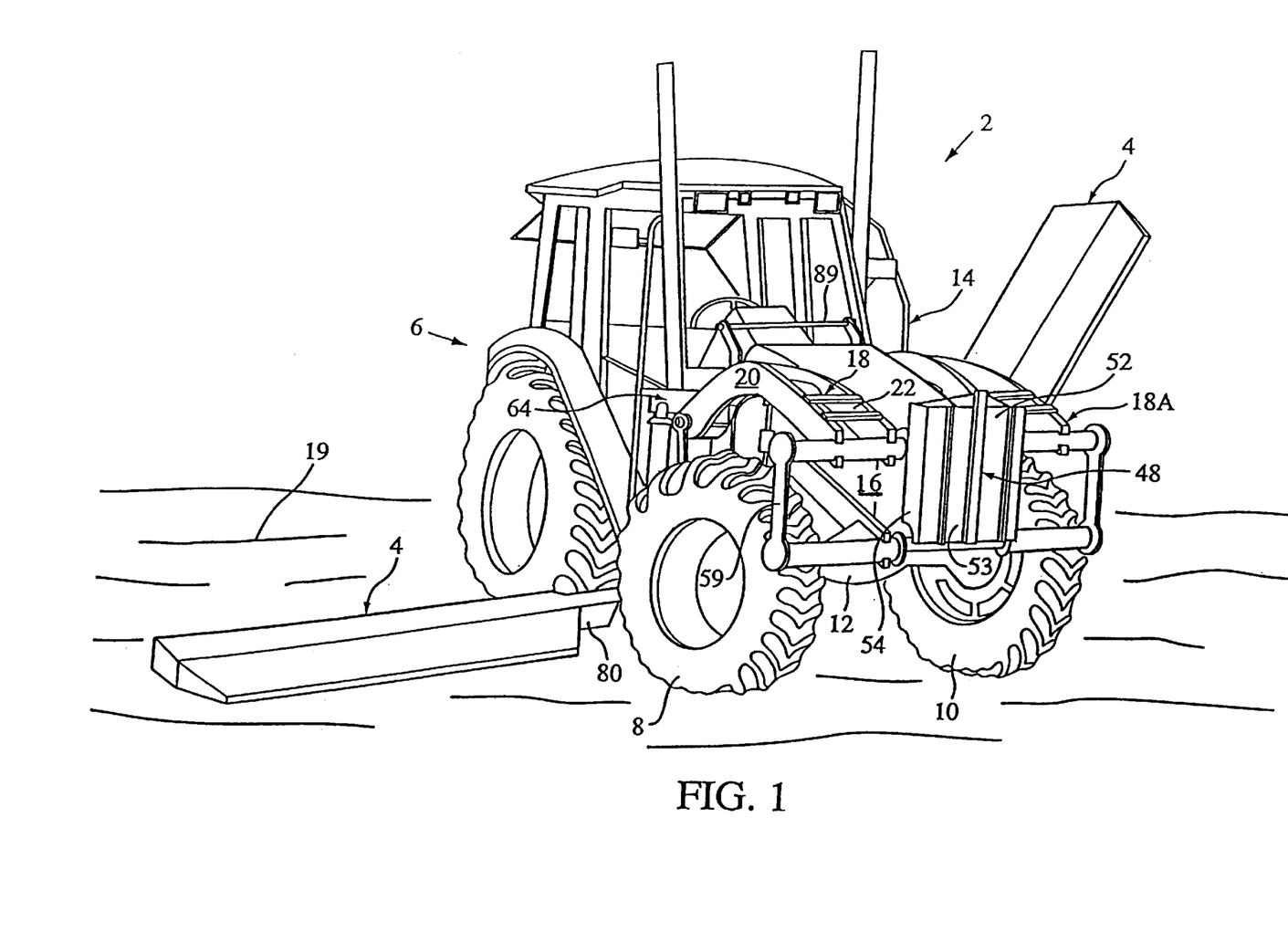
FIG. 1 is an isometric view of a short wheel base tractor equipped with a pair of right and left parallelogram boom devices of the invention supporting a left agricultural spray canopy in raised position and a right agricultural spray canopy in lowered operating position.

Referring in detail to the drawings, a parallelogram boom device 2 of the invention is structured for mounting agricultural implements 4 to a short wheel base tractor 6 having a right front wheel 8 and left front wheel 10 supported via an axle unit 12 on a chassis 14 that carries a motor assembly 16 between the wheels 6 & 8 and for adjusting the position of such mounted implements relative to ground 19 during their operation.

The boom device 2 comprises a right parallelogram arrangement 18 and a mirror image left parallelogram arrangement 18A. It will be understood that the new boom devices of the invention may consist of a single right or left parallelogram boom arrangement per se or in combination with a short wheel base tractor. Since the construction of arrangements 18 & 18A are mirror images of each other, the detailed description below is limited to the right arrangement 18.

Figures 2, 3A:
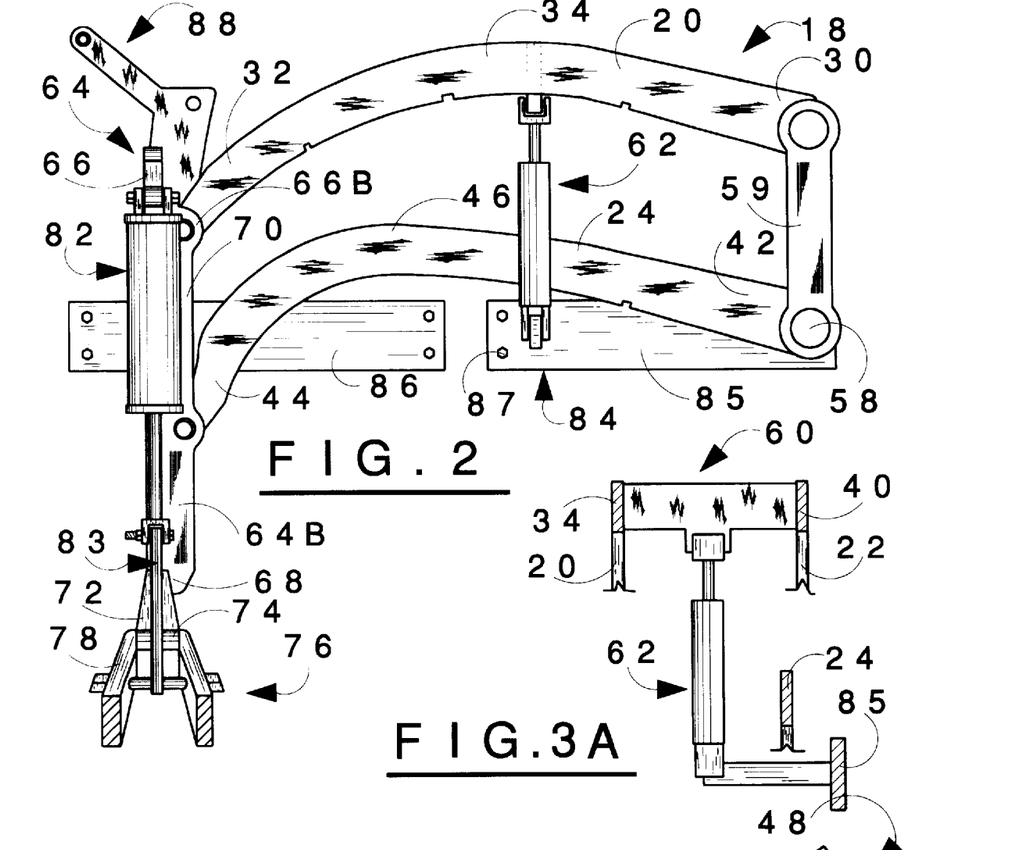
FIG. 2 is a lateral view, partially in section, of a major portion of a parallelogram boom device of the invention.
FIG. 3A is a sectional view taken on the line III—III of FIG. 3.
Figure 3:
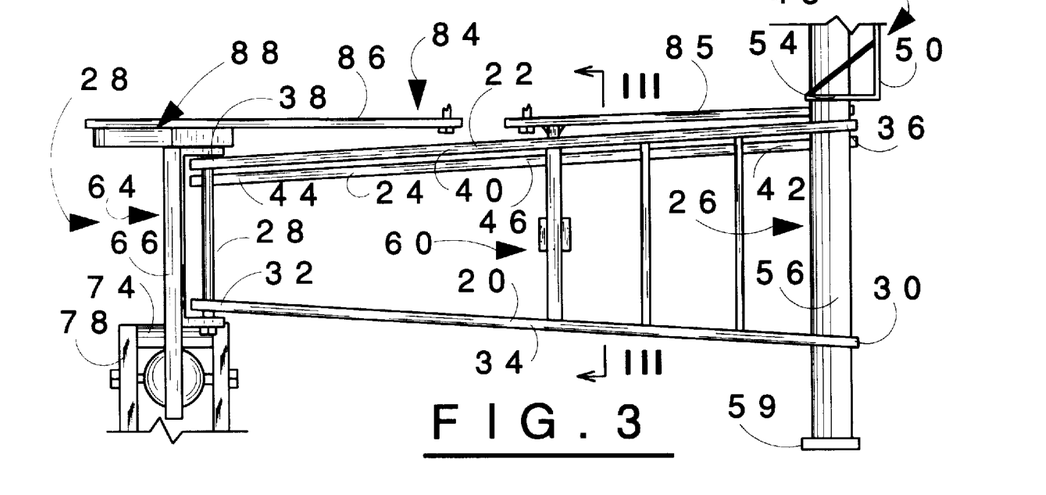
FIG. 3 is a plan view, partially fragmented, corresponding to the lateral view of FIG. 2.

The right parallelogram arrangement 18 comprises a first upper beam 20 horizontally and longitudinally aligned with a second upper beam 22 plus a single lower beam 24 longitudinally aligned with the first and second upper beams 20 & 22, but at a horizontal level therebelow. The arrangement 18 being defined by a forward end 26 and a rearward end 28.

The first upper beam 20 has a front end 30, a rear end 32 and a arcuate midsection 34. Also, the second upper beam 22 has a front end 36, a rear end 38 and a arcuate midsection 40. The single lower beam 24 has a front end 42, a rear end 44 and a arcuate midsection 46.

A mount means 48, positioned adjacent the forward end 26 of the parallelogram arrangement 18, comprises a vertical plate 50, a top end 52, a bottom end 53 plus right and left support legs 54 that extend normally from the plate 50 to support the mount 48 upon the chassis 14 inboard of the wheels 8 & 10 and in front of the motor assembly 16.

A horizontal top spar 56 is supported by the top end 52 parallel to the vertical plate 50 and a horizontal bottom spar 58 is similarly supported by the bottom end 53. The outboard ends of the spars 56 & 58 are equipped with braces 59.

The front ends 30 & 36 of the upper beams 20 & 22 respectively are rotationally carried by the top spar 56 and the front end 42 of lower beam 24 is rotationally carried by the bottom spar 58.

Bridle means 60 has one end fixed to the arcuate midsection section 34 and an opposed end fixed to the arcuate midsection section 40 holding the beams 20 & 22 horizontally spaced apart and longitudinally aligned.

Hydraulic boom piston means 62 is attached to bridle means 60 to raise and lower the parallelogram arrangement 18 relative to the ground 19.

A frame 64 having an upper portion 66, a lower portion 68 and a midportion 70, is positioned vertically adjacent the rearward end 28 of the parallelogram arrangement 18. The first and second rear ends 32 & 38 of the upper beams are rotatably carried by the upper portion 66 and the third rear end 44 of the lower beam is rotatably carried by the midportion 70.

A lug 72 extends laterally from the lower portion 68 of the frame 64 and carries a bearing 74 outboard of the lower portion 68.

There is an implement mounting arm 76 having an inboard end 78 and an outboard end 80. The inboard end 78 is rotationally pinned to the bearing 74 and the outboard end 80 is equipped to support the agricultural implement 4.

Hydraulic second piston means 82 is attached to the implement mounting arm 76 via linkage 83 to raise and lower arm 76.

The boom arrangement 18 is fixed to the tractor chassis 14, in addition to the mount 48, by support means 84. In the embodiment shown in FIGS. 2 & 3, such support means 84 comprises a front plate 85 and a rear plate 86 which are fastened to the chassis 14 by bolts 87. In other embodiments (not shown), the support means 84 may be an elongated single plate (not shown) or a plurality of angle brackets (not shown) which are structured to accommodate the different contours of the tractor chassis to which the boom arrangement 18 needs to be mounted.

The boom arrangement 18 also preferably includes a thrust means 88 to stabilize the boom arrangement against lateral strains. Advantageously, thrust means 88 includes a bracing cross-bar 89 that extends over the motor assembly 16.

With reference to FIGS. 3 & 4–7, a kickback device 90 that forms a portion of the parallelogram boom device 2 basically comprises an accumulator 92 having T-connector 93, valve 94 with flow controller 95, valve 96 with flow controller 97, relief valve 98 with control lever 99, kickback cylinder 100 and pressure gage 102.

Figure 8:
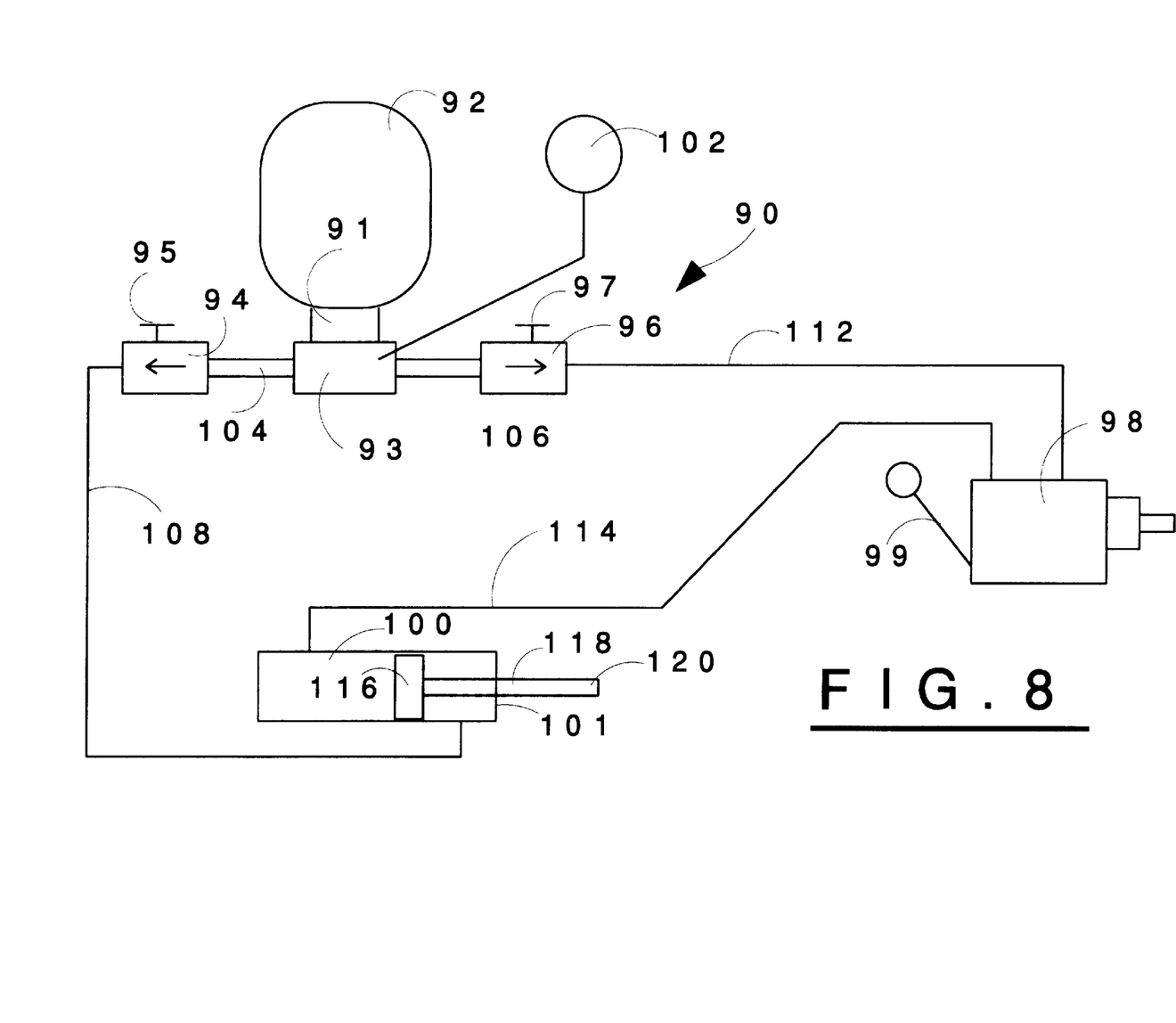
FIG. 8 is a diagrammatic view of a kickback system of the invention to protect any agricultural implement mounted upon a tractor in accordance with the invention against damage in the event the implement encounters an obstruction.

Typically the accumulator 92 comprises a flexible bladder (not shown) enclosed in a metal housing with a nipple (not shown) that connects to the T-connector 93 via the neck 91.

Tubing 104 joins T-connector 93 to valve 94 for controlled fluid flow there through in the direction of the arrow by manipulation of controller 95, but there is free flow of fluid through valve 94 in the opposite direction, i.e., from valve 94 to T-connector 93.

Tubing 106 joins T-connector 93 to valve 96 for controlled fluid flow there through in the direction of the arrow by manipulation of controller 97, but there is free flow of fluid through valve 96 in the opposite direction, i.e., from valve 96 to T-connector 93.

Tubing 108 connects valve 94 with kickback cylinder 100 for flow of fluid into or out of end 101 thereof and tubing 110 connects kickback cylinder 100 for flow of fluid into or out of end 103 of kickback cylinder 100 into or out of relief value 98.

Tubing 112 connects valve 96 with relief valve 98 for flow of fluid into or out of relief valve 98. Tubing 114 operatively connects valve 98 to cylinder 100.

A piston 116 with attached shaft 118 reciprocates in the kickback cylinder 100. The end 120 of shaft 118 connects via a hinge 122 to implement mount 124 to rotate it about the hinge 126 fixed on end 80 of implement mounting arm 76.

Figure 4:
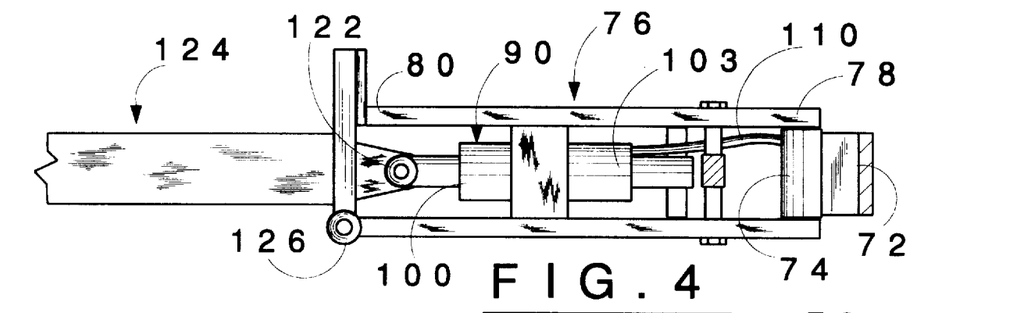
FIG. 4 is a fragmentary plan view, partially in section, of the implement lifting portion of a parallelogram boom device of the invention.
Figure 5:
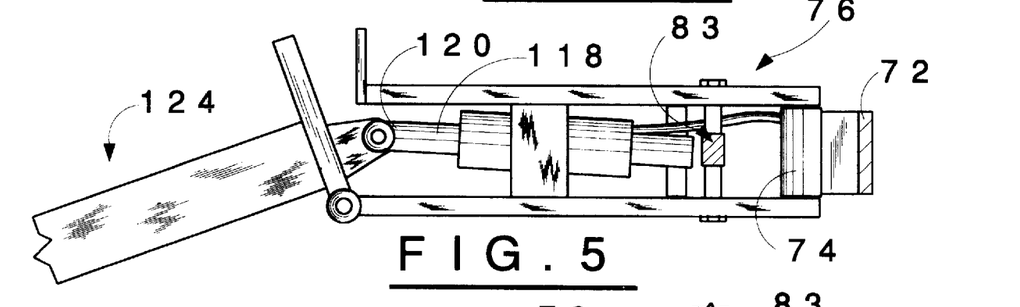
FIG. 5 is a view similar to FIG. 4, but with the implement bearing arm in a partially kickback position.
Figure 6:
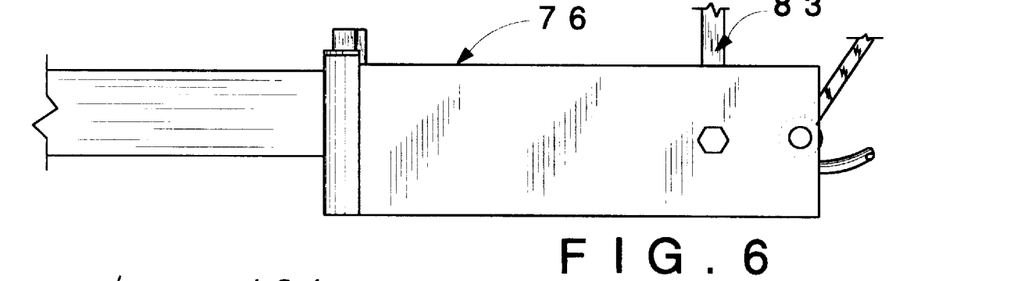
FIG. 6 is a lateral view corresponding the plan view of FIG. 4.
Figure 7:
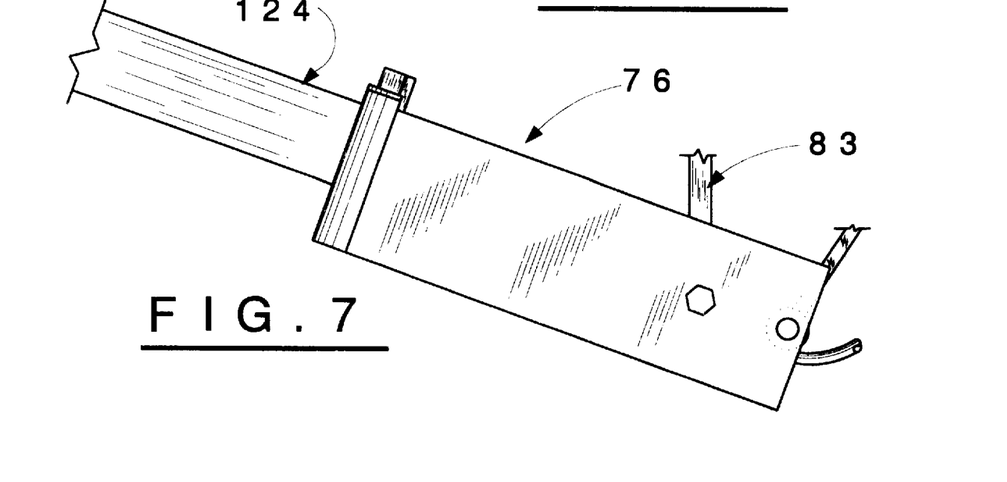
FIG. 7 is a lateral view similar to FIG. 6, but with the implement lifting portion raised at an angle relative to the horizon.

Piston 116 serves to move a implement 4 carried by mount 124 from a lateral operational position shown in FIG. 4 to a safety kickback position shown in FIG. 5. Piston means 82 via linkage 83 serves to move mounting arm 76 from a horizontal operational position as shown in FIG. 6 to an elevated non-operational position as shown in FIG. 7.

Figure 9:
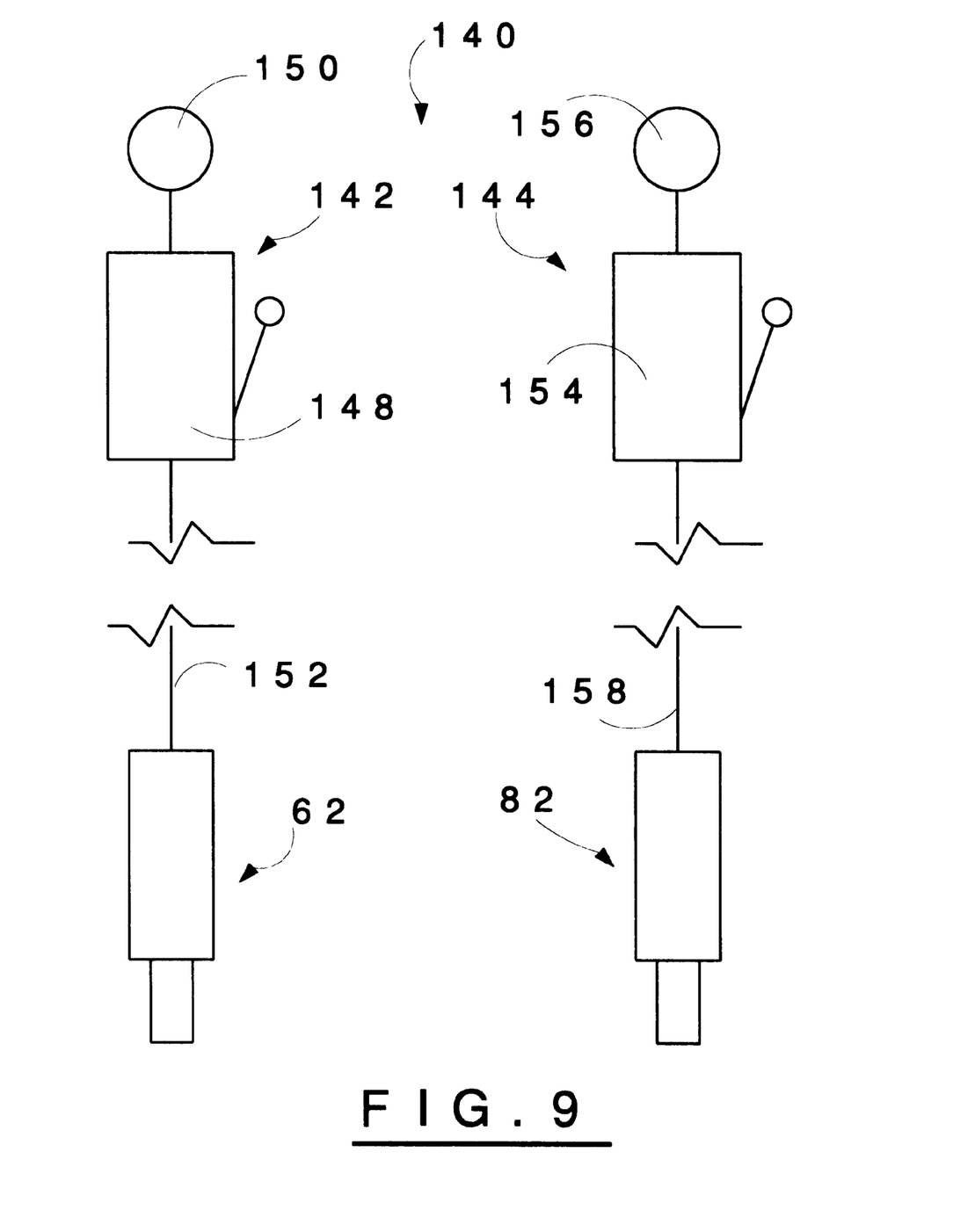
FIG. 9 is a schematic view of a hydraulic system used by a rider positioned on a tractor to operate a parallelogram boom device of the invention mounted on the tractor.

Referring to FIG. 9, a hydraulic system 140 for powering boom device 2 comprises a pair of control units 142 and 144 that are connected in conventional manner to a hydraulic pump (not shown) and hydraulic fluid sump (not shown). Where the boom device 2 consists of both right and left boom arrangements 18, there will be a duplicate (not shown) of the system 140 to power the right or left arrangement, as the case may be.

Control unit 142 controls the raising and lowering of the boom arrangement 18. It comprises a lever operated valve 148 that is monitored by the pressure gauge 150 and is operatively connected by fluid line 152 to the boom piston means 62.

Control unit 144 controls the raising and lowering of the instrument mounting arm 76. It comprises a lever operated valve 154 that is monitored by the pressure gauge 156 and is operatively connected by fluid line 158 to the second piston means 82.

Advantageously, the control units 142 and 144 are bundled together with control value 98 and gage 102 on a panel (not shown) accessing the tractor operator to a convenient trio of three gages and three control levers, in the case of a single right or left boom arrangement 18, or a display of six gages and six control levers in the case of duplex right and left boom arrangements 18 & 18A.

Figures 10, 11, 12:
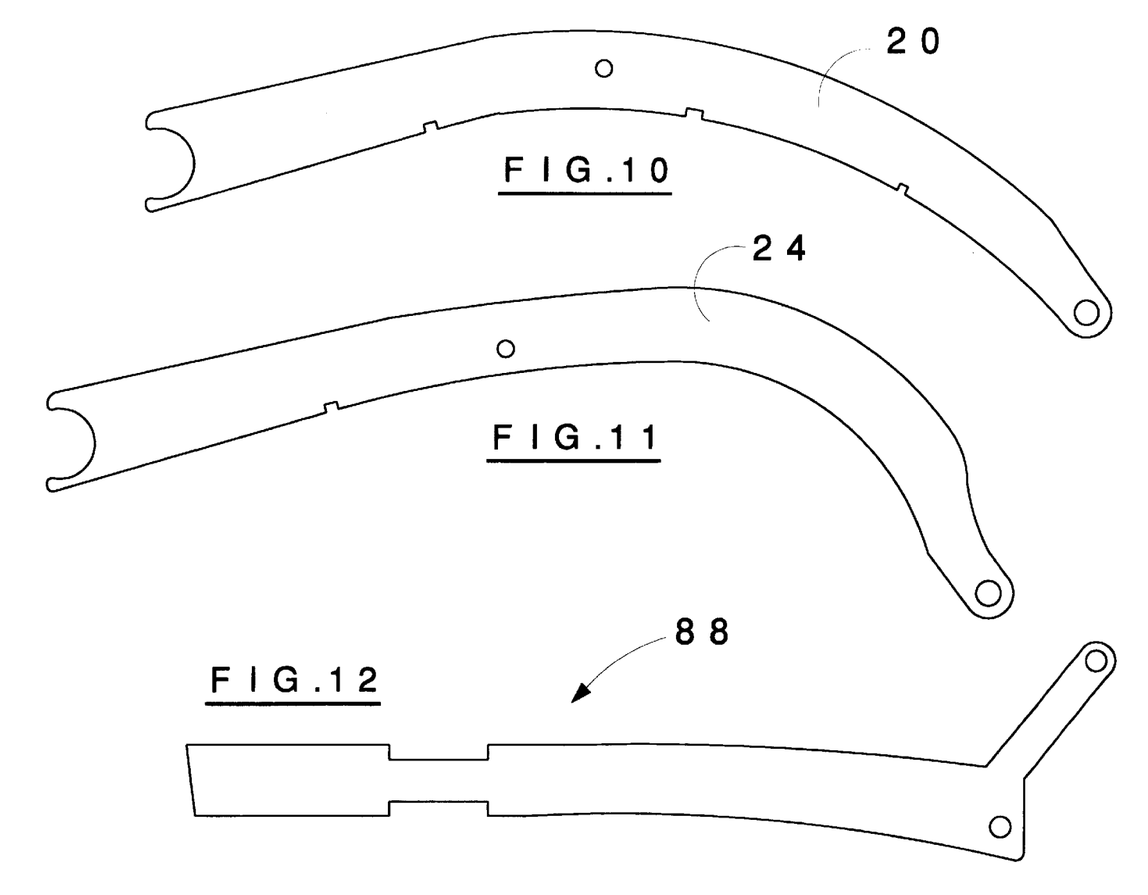
FIGS. 10–15 are lateral views of specific parts of a preferred embodiment of a parallelogram boom device constructed in accordance with the invention.

FIG. 10 is a lateral view of an upper beam 20 of the parallelogram arrangement 18.

FIG. 11 is a lateral view of an lower beam 24.

FIG. 12 is a lateral view of thrust means 88.

Figure 13:
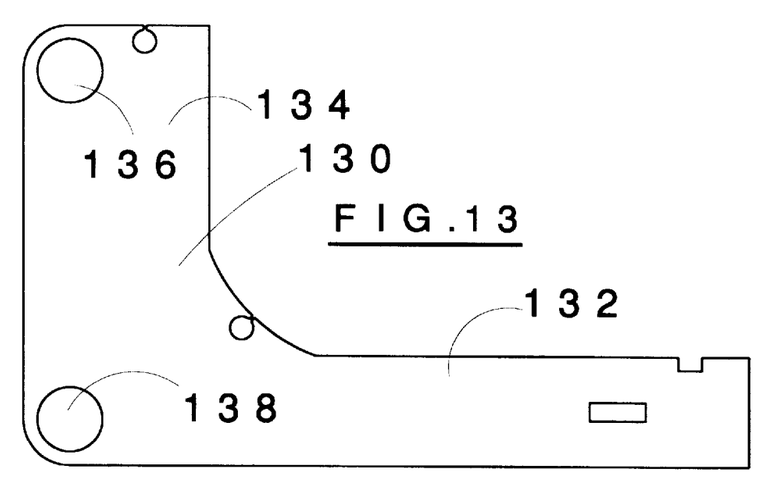

FIG. 13 is a lateral view of bracket 130 that forms a part of the mount means 48. It comprises a horizontal portion 132 that clamps to the chassis 14 and a vertical portion 134 contains bore 136 to receive and support top spar 56 and a similar bore 138 for bottom spar 58.

Figures 14, 15:
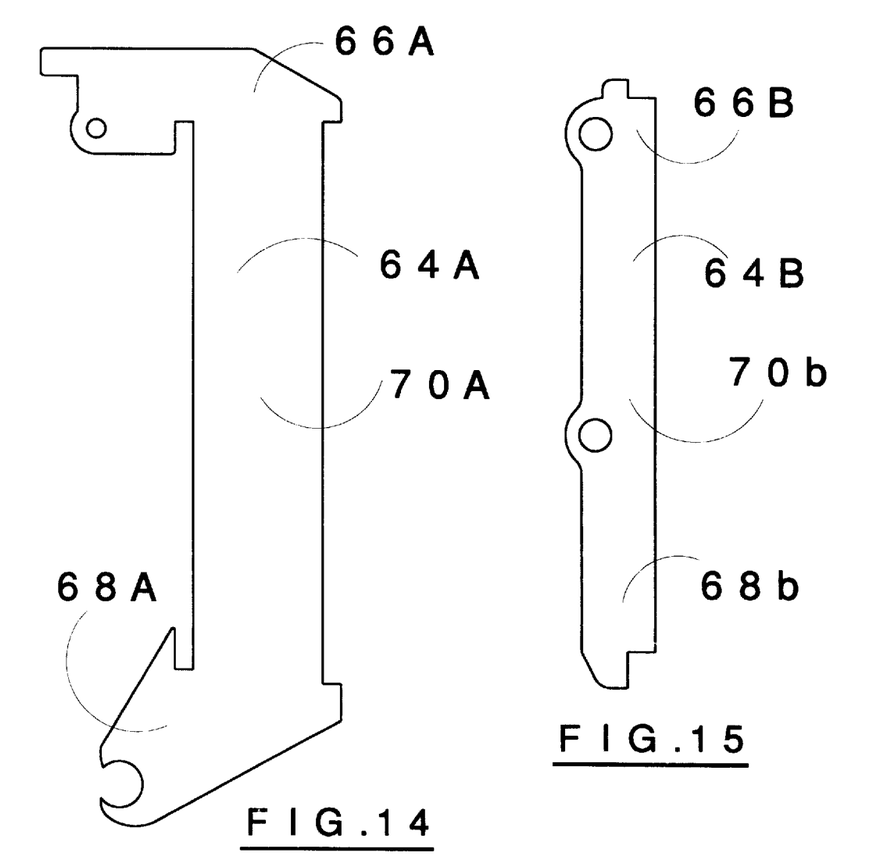

FIG. 14 is a lateral view of part 64A of the frame 64 and comprises an upper portion 66A, lower portion 68A and midportion 70A. Only the top portion 66A shows in FIG. 2.

FIG. 15 is a lateral view of part 64B of the frame 64 and comprises an upper portion 66B, lower portion 68B and midportion 70B, all of which are shown in FIG. 2.

Those skilled in the art will clearly recognize that substitutions may be made for specific parts that have been described for construction of the embodiments of the invention as disclosed herein. Thus, instead of the manual type valves 148, 154 and others, solenoid or cable assisted valves may be used. Similar suitable substitutions for other specific parts will be apparent to those skilled in the art.

What is claimed is:

1. The combination of a short wheel base tractor having right and left front wheels mounted via an axle unit to a chassis that carries a motor assembly between said wheels and a pair of parallelogram boom devices for mounting agricultural implements to said tractor and adjusting the position of such mounted implements relative to ground during their operation, one of said parallelogram boom devices being mounted inboard of said right wheel and the other of said parallelogram boom devices being mounted inboard of said left wheel, said boom devices each comprising:

a parallelogram arrangement of a first upper beam horizontally aligned with a second upper beam along a horizontal axis plus a single lower beam longitudinally aligned with said first and second upper beams, but at a horizontal level therebelow, said parallelogram arrangement being defined by a forward end and a rearward end, mount means adapted to be carried upon said chassis inboard of said wheels comprising a vertical plate, a horizontal top spar and a horizontal bottom spar supported by said mount in a plane parallel to said plate, said forward end of said parallelogram arrangement being supported by said top and bottom spars, hydraulic piston means attached to said parallelogram arrangement to raise and lower it, a frame positioned vertically adjacent said rearward end of said parallelogram arrangement, said frame being supported by said rearward end of said parallelogram arrangement, a lug that extends laterally from said frame carrying an outboard bearing, an implement mounting arm defined by an inboard end and an outboard end, said inboard end being rotationally pinned to said bearing and said outboard end being equipped to support an agricultural implement, and hydraulic piston means attached to said implement mounting arm to raise and lower it.

2. The combination of claim 1 that includes kickback means to retract said implement mounting arm rearwards from its forward direction of travel in the event an implement supported thereby encounters an obstruction.

3. The combination of claim 2 wherein said kickback means comprises an accumulator, a T-connector defined by an accumulator connection, a first valve connection and a second valve connection, a first flow control value joined to said first valve connection for controlled flow of fluid there through away from said accumulator, but free flow toward said accumulator, a second flow control value joined to said second valve connection for controlled flow of fluid there through away from said accumulator, but free flow toward said accumulator, hydraulic cylinder means and a relief valve.

4. The combination of claim 3 wherein said hydraulic cylinder means comprises a cylinder, a piston that reciprocates therein defined by a first face and a second face, a shaft defined by an internal end and an external end, said internal end being attached to said first face, a first cylinder port in said cylinder that communicates with said first face and a second cylinder port in said cylinder that communicates with said second face, first tubing operatively joining said first flow control valve to said first cylinder port for fluid flow there between.

5. The combination of claim 4 wherein said relief valve comprises a first relief valve port and a second relief valve port, second tubing operatively joining said second flow control valve to said first relief valve port for fluid flow there between and third tubing operatively joining said second cylinder port to said second relief valve port for fluid flow there between.

6. A parallelogram boom device for mounting agricultural implements to short wheel base tractors having right and left front wheels mounted via an axle unit to a chassis that carries a motor assembly between said wheels and adjusting the position of such mounted implements relative to ground during their operation, said boom device comprising:

a parallelogram arrangement of a first upper beam horizontally aligned with a second upper beam along a longitudinal axis plus a single lower beam longitudinally aligned with said first and second upper beams, but at a horizontal level therebelow, said arrangement being defined by a forward end and a rearward end, said first upper beam defined by a first front end, a first rear end and a first arcuate midsection integrally joining said first front end to said first rear end, said second upper beam defined by a second front end, a second rear end and a second arcuate midsection integrally joining said second front end to said second rear end, said single lower beam defined by a third front end, a third rear end and a third arcuate midsection integrally joining said third front end to said third rear end, a U-shaped mount, positioned adjacent said forward end of said parallelogram arrangement, comprising a vertical plate defined by a top end and a bottom end plus right and left support legs that extend normally from said bottom end to support said mount upon said chassis inboard of said wheels and in front of said motor assembly, a horizontal top spar supported by said top end and a horizontal bottom spar supported by said bottom end, said first and second front ends of said upper beams being rotationally carried by said top spar, said third front end of said lower beam being rotationally carried by said bottom spar, a bridle having one end fixed to said first arcuate midsection and an opposed end fixed to said second arcuate midsection holding said first and second beams horizontally spaced apart and longitudinally aligned, first hydraulic piston means attached to said bridle to raise and lower said parallelogram arrangement relative to said ground, a frame, defined by an upper frame portion, a lower frame portion and a central frame portion, positioned vertically adjacent said rearward end of said parallelogram arrangement, said first and second rear ends being attached to said upper frame portion and said third rear end being attached to said central frame portion, a lug that extends laterally from said lower frame portion carrying a bearing outboard of said lower portion, an implement mounting arm defined by an inboard end and an outboard end, said inboard end being rotationally pinned to said bearing and said outboard end being equipped to support an agricultural implement, and second hydraulic piston means attached to said implement mounting arm to raise and lower it.

7. The combination of a short wheel base tractor having right and left front wheels mounted via an axle unit to a chassis that carries a motor assembly between said wheels and at least one parallelogram boom device for mounting an agricultural implement to said tractor and adjusting the position of such mounted implement relative to ground during its operation, said parallelogram boom device comprising:

a parallelogram arrangement of a first upper beam horizontally and longitudinally aligned with a second upper beam plus a single lower beam longitudinally aligned with said first and second upper beams, but at a horizontal level therebelow, said parallelogram arrangement being defined by a forward end and a rearward end, a U-shaped mount carried upon said chassis inboard of said wheels comprising a vertical plate, a horizontal top spar and a horizontal bottom spar supported by said mount in a plane parallel to said plate, said forward end of said parallelogram arrangement being supported by said top and bottom spars, hydraulic piston means attached to said parallelogram arrangement to raise and lower it, a frame positioned vertically adjacent said rearward end of said parallelogram arrangement, said frame being supported by said rearward end of said parallelogram arrangement, a lug that extends laterally from said frame carrying a outboard bearing, an implement mounting arm defined by an inboard end and an outboard end, said inboard end being rotationally pinned to said bearing and said outboard end being equipped to support an agricultural implement, and hydraulic piston means attached to said implement mounting arm to raise and lower it.

* * * * *